United States Patent [19]
Van Achterberg et al.

[11] 4,442,761
[45] * Apr. 17, 1984

[54] APPARATUS FOR MAKING PASTRY PRODUCTS

[75] Inventors: Johan Van Achterberg, Easton; George N. Miles, Norwalk, both of Conn.

[73] Assignee: Elsie Palmieri, Danbury, Conn.

[*] Notice: The portion of the term of this patent subsequent to Jul. 17, 2000, has been disclaimed.

[21] Appl. No.: 190,026

[22] Filed: Sep. 23, 1980

[51] Int. Cl.³ .............................................. A47J 37/12
[52] U.S. Cl. ........................................ 99/404; 99/407; 99/409; 99/431; 426/438
[58] Field of Search .................. 99/404, 405, 407, 409, 99/426, 427, 431, 353; 426/438

[56] References Cited
U.S. PATENT DOCUMENTS

1,781,411 11/1930 Reiber ............................... 99/431 X
2,614,485 10/1952 Sinkwitz ........................... 99/431 X
4,026,202 5/1977 Szpur ............................... 99/431 X

Primary Examiner—Billy J. Wilhite
Attorney, Agent, or Firm—William G. Rhines

[57] ABSTRACT

This invention relates to methods and apparatus for producing bakery goods, and in one embodiment useful in producing so-called rosettes, comprises forming means for forming the desired shape from batter, and cooking means in the form of a tank for containing heated oil, wherein the tank includes means for moving the bakery goods from the region of original exposure of the batter to the oil to means for turning the goods upside down and re-exposing them to the cooking oil, and means for removing the cooked goods from the cooking oil, wherein said means are arrayed in tandem and have associated means for causing formed products to be moved successively from each of said means to the next in sequence, the apparatus being adapted to maintain the forming means within prescribed temperature limits and substantially entirely free from cooking liquid upon being dipped in the batter.

12 Claims, 11 Drawing Figures

APPARATUS FOR MAKING PASTRY PRODUCTS

BACKGROUND OF THE INVENTION

In the field of bakery products, it is known to produce a certain delicacy known as a "swedish rosette". It is a deep-fried shell, made from batter which, alternatively to its natural taste, may be flavored with anise or other known flavorings, and which is usually coated with powdered sugar. In the past, such products have been produced by means of a cast iron mold affixed to one end of a handle, the mold being in the desired shape of the bakery product to be produced. Typically, the configuration is in the form of a five or six pointed star, superimposed upon one or more concentric rings. In practice, a batter is made, principally from flour, oils and other ingredients, so that it is smooth and of moderately thick consistency. The forming iron, which preferably has been pre-heated, is dipped into the batter, so that the sides and bottom of the iron are substantially coated with batter. While so coated, the iron is immersed in a container of hot cooking oil, such as peanut or other vegatable oil. The effect of this is to cause the batter to be cooked and, as it does so, to become slightly crisp. In this condition, the iron may be lifted up and the piece of bakery goods so formed will disassociate from the iron and will remain in the oil. The product may, by means of a spatula or other instrument, be turned over so that it cooks on the other side. Following this, it may be removed from the cooking oil and optionally coated with powdered sugar or the like. The resulting product is a crisp, rather crunchy, but delicate pastry which is highly edible.

Such products are in public demand, but because of the relatively high labor costs and long time required for production of such goods, mass production means and methods are desired. They have not been available because of the relatively delicate nature of the product and difficulties in producing it without damage or destruction by other than hand processes.

Accordingly, an object of this invention is to provide means for producing delicate shaped bakery products from batter cooked in cooking oil.

Another object of this invention is to provide such means whereby such products may be mass-produced.

Still another object of this invention is to provide means for so producing such products on an automated basis.

SUMMARY OF INVENTION

Desired objectives may be achieved through practice of the present invention, embodiments of which include apparatus for producing pastry products wherein a batter container is juxtaposed to a tank for holding cooking liquid and said apparatus includes forming means having at least one forming iron for alternate dipping into batter contained in said batter container and into liquid contained in said tank, conveyor means for propelling battermade products as they cook along the surface of said cooking liquid, inverter means partway along the path of said conveyor means for inverting partially cooked products and returning them to such liquid for further cooking, and extractor means for removing such products from such liquid upon their being cooked, wherein said apparatus is adapted for causing said iron to be substantially free of cooking liquid and within pre-determined upper and lower temperature limits upon being dipped in said batter.

DESCRIPTION OF DRAWINGS

This invention may be understood from the description which follows and from the appended drawings in which.

DESCRIPTION OF PREFERRED EMBODIMENTS

Figure 1:
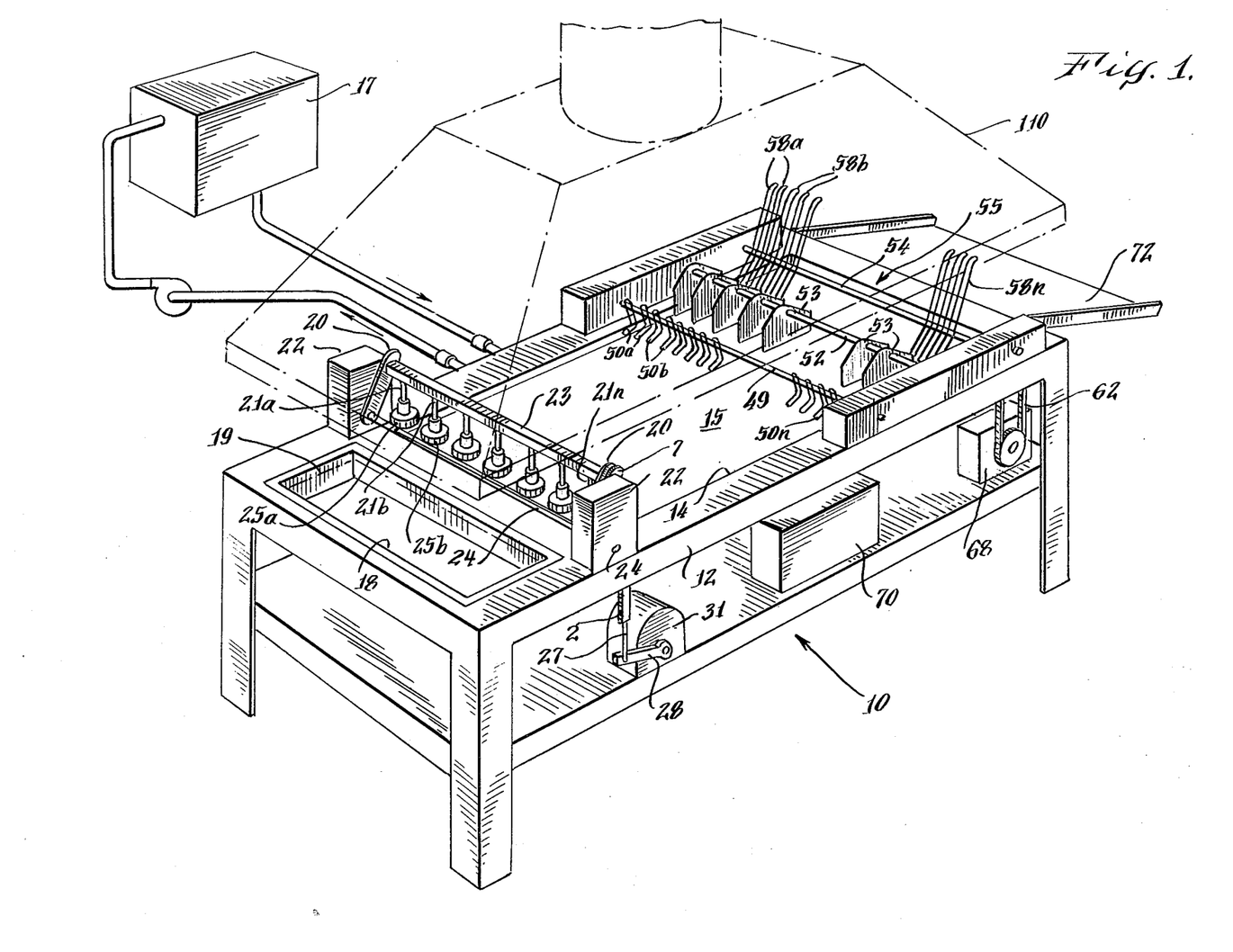
FIG. 1 is a perspective view of an embodiment of this invention.

Referring first to FIG. 1, there is depicted apparatus 10 embodying the present invention. It comprises a main frame 12 one end of which is in the form of an open-topped vat 14 for containing hot cooking medium 15, such as vegatable oil. The oil may be heated by any of a variety of known per se heating means, such as internal steam or electrical coils or elements (not shown), or an external heater 17, in the form of a furnace or other heat exchange medium through which the cooking medium 15 may be circulated and heated.

At the other end of the main frame 12, is a batter chamber 18, which advantageously may be adapted to have positioned therein one or more removeable batter containers to facilitate replenishing the supply of batter 19 from time to time.

Extending upward from the top of both sides of the main frame 12 near a batter chamber end are supports 22, through which is positioned a rotatable shaft 24 to which are affixed lever arms 20, joined by a connecting rod 23 which is pivotally affixed at its ends to the ends of the arms 20.

Figures 7, 8:
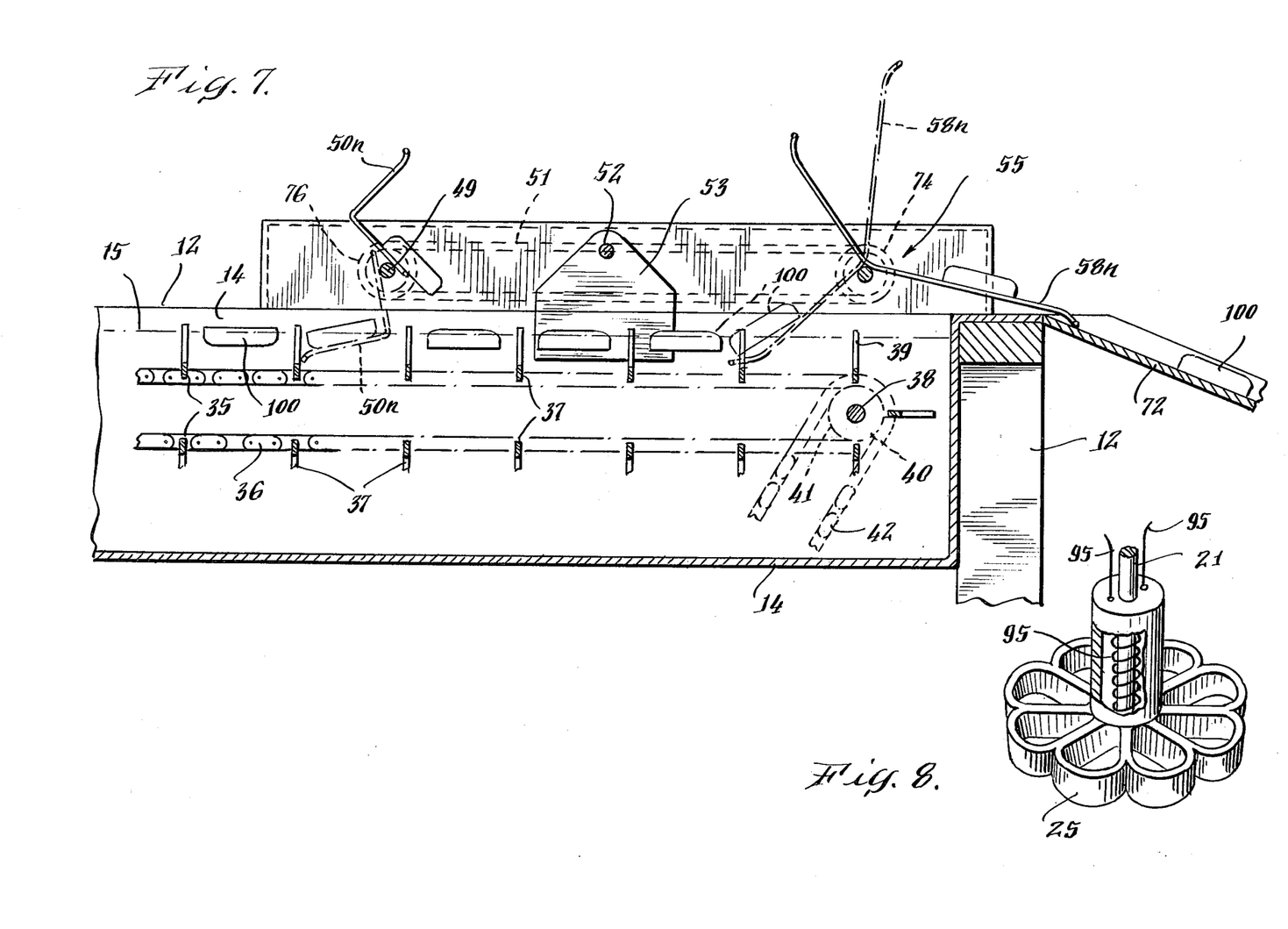
FIG. 7 is a cross-section through lines 7—$7^1$ as shown in FIG. 2.
FIG. 8 is a perspective view of an iron useful in the practice of the present invention.

Arrayed along the length of the connecting rod 23 and pivotally affixed thereto are shafts $21a$, $21b$ ... $21n$ respectively, to the bottom end of each of which respectively is affixed a forming iron $25a$, $25b$ ... $25n$. Six such shafts and irons are shown in FIG. 1, but it will be obvious from what follows that more or fewer may be utilized in the practice of the present invention. A typical such forming iron is illustrated in FIG. 8. It will be noted that such devices may be made from aluminum or other metals, although advantageously they may be made from cast iron so as to be readily formable, durable, and heat retentive. This last characteristic, which is more characteristic of cast iron, for example, than of cast aluminum, has been found to be desirable in the interests of maintaining the temperature limits at the time it is dipped into the batter, as this facilitates formation of the pastry product from the batter, retention of the batter on the iron prior to cooking, and the release of the pastry products 100 from the iron when the former is being cooked in the cooking medium. An outer teflon coating may also be used to further facilitate removal of the finished product from the irons. Optionally, and particularly where the irons are made from material, such as cast aluminum, which may not inherently absorb enough heat from exposure to the hot cooking oil or hold such heat so as to maintain its temperature between those pre-determined limits which will optimize product formation, batter retention, and product release as described above, such irons may be supplementally temperature modified, as by an internal electric resistance wire 95, induction heating, gas flame jets, or other known per se means. It has been found in practice that the temperature of the irons upon dipping into the batter optimally should not be less than about 250°–275° F., although temperatures as high as about 300° F. have been found to produce satisfactory results. Since the temperature of the cooking oil in embodiments such as the one herein described normally is kept at about 380°–400° F., the irons usually will cool somewhat before re-dipping into the batter. Of course, this is desirable provided the amount of cooling is limited to keep the iron temperature within the desired range upon re-dipping into the batter.

This consideration becomes especially critical in certain instances, since it has been found to be desirable for the apparatus also to be so adapted that the irons will be as free as possible from cooking oil upon being dipped into the batter. The reasons for this are elaborated herein later in the description of an embodiment which includes a period during which the irons are held stationary between removal from the cooking liquid and dipping into the batter. However, it is to be understood that it is within the contemplation of this invention that in addition to so "de-greasing" the irons by gravitationaldripping, the apparatus may be adapted for facilitating "de-greasing" of the irons by any means which will produce such a result, such as making the irons from material which inherently does not tend to become "wetted" by the cooking liquid, an air blast, evaporative heating, mechanical wiping, and vibration or shaking, as well as any combination of these or other surface-liquid removal means. It will be apparent that with certain of such "de-greasing" adaptions, such as air blasts or supplementary heating, for example, as well as the convective heat losses which may occur during a positionally held "dripping" mode of the type hereinafter described, the temperature varying effects resulting from the use of such adaptations may tend to run counter to, or even frustrate, the retention of the temperature of the irons within prescribed limits which is desired for the reasons stated above. For such reasons it may be necessary or desirable to further adapt the apparatus, by the use of associated heating and/or cooling means, to hold the temperature of the irons within such predetermined temperature extremes.

Figure 4:
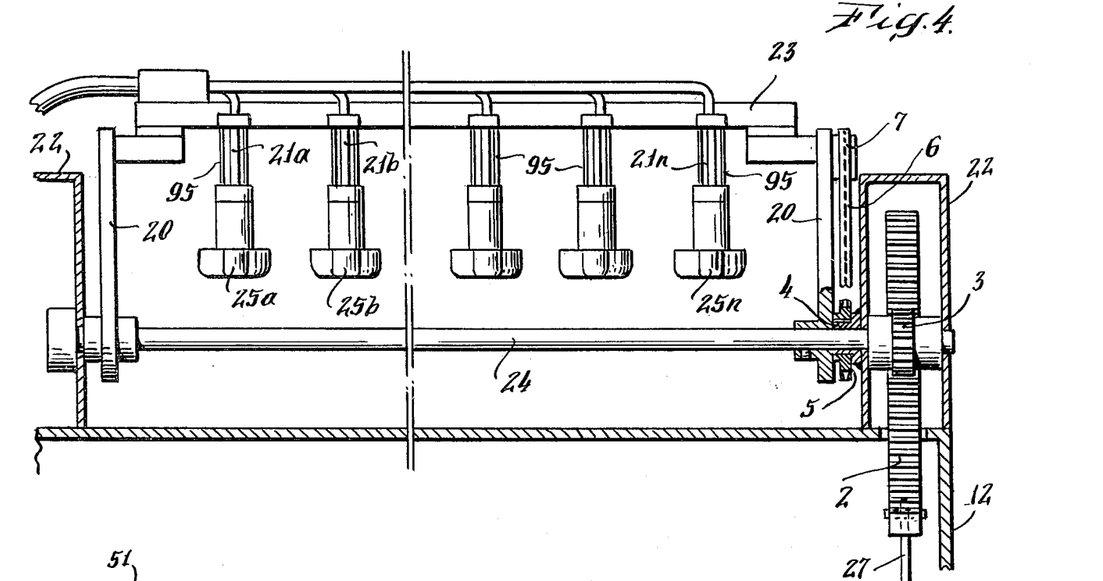
FIG. 4 is a cross-section through lines 4—$4^1$ as shown in FIG. 3.

As shown in FIG. 1, the lever arms 20 may be caused to pivot back and forth about the shafts 22 through 65 operation of the connecting rod 27 as it is actuated by the lever arm 28. Affixed to the upper end of the arm 27 is a rack 2, the pinion 3 of which may be more clearly seen in FIG. 4. A sleeve 4, through which the shaft 24 runs and with respect to which the shaft 24 moves, is stationary with respect to the adjacent support 22. Affixed to the sleeve 4 is a sprocket 5 to which is engaged a chain 6 that is also engaged with the teeth of a sprocket 7 that is affixed to the rod 23. By this means, as the lever arm 28 is actuated upward and downward in response to motion of the servo motor 31 as hereinafter described, the rack is moved correspondingly, causing the arms 20 to pivot about the shaft 24, to dip the irons 25a, 25b ... 25n in and out of the batter and cooking oil sequentially. At the same time, the sprockets 5, 7 and the chain 6 act cooperatively with the chain 6 to cause the rods 21a, 21b ... 21n always to be oriented vertically, to facilitate the dipping of the heads 25a, 25b ... 25n. This effect occurs because the sprocket 5 is fixed and the rod 23 is pivotally mounted but fixed to the sprocket 7, and the two sprockets are interconnected by the chain 6. As noted above, the lever arm 28 is actuated by the servo motor 31. The servo motor 31, is actuated periodically according to the desired sequence, time and direction, in order to effectuate the desired process program, such as that illustrated in FIG. 9. As will be apparent from what follows, the several servo-motors in the apparatus are similarly actuated by a synchronizer 70 of known per se design. As will be explained further later, as the servo motor 31 so activates the arms 26a, 26b ... 26n, each batter coated iron is held in the hot cooking medium for a limited time to enable partial cooking to take place, with the result that when the iron is removed, the now partially cooked product will drop free from the iron and remain in the cooking oil, but will have sufficient structural integrity not to disintegrate.

Figure 2:
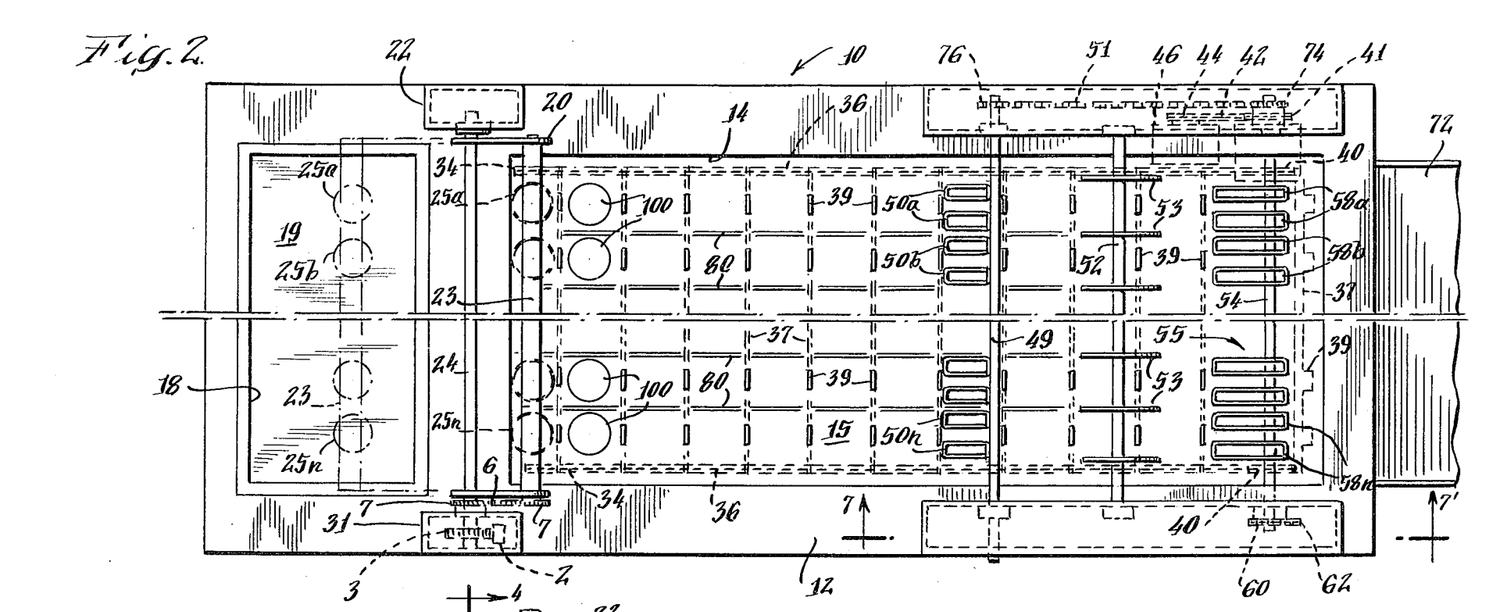
FIG. 2 is a plan view of the embodiment of this invention shown in FIG. 1.
Figure 3:
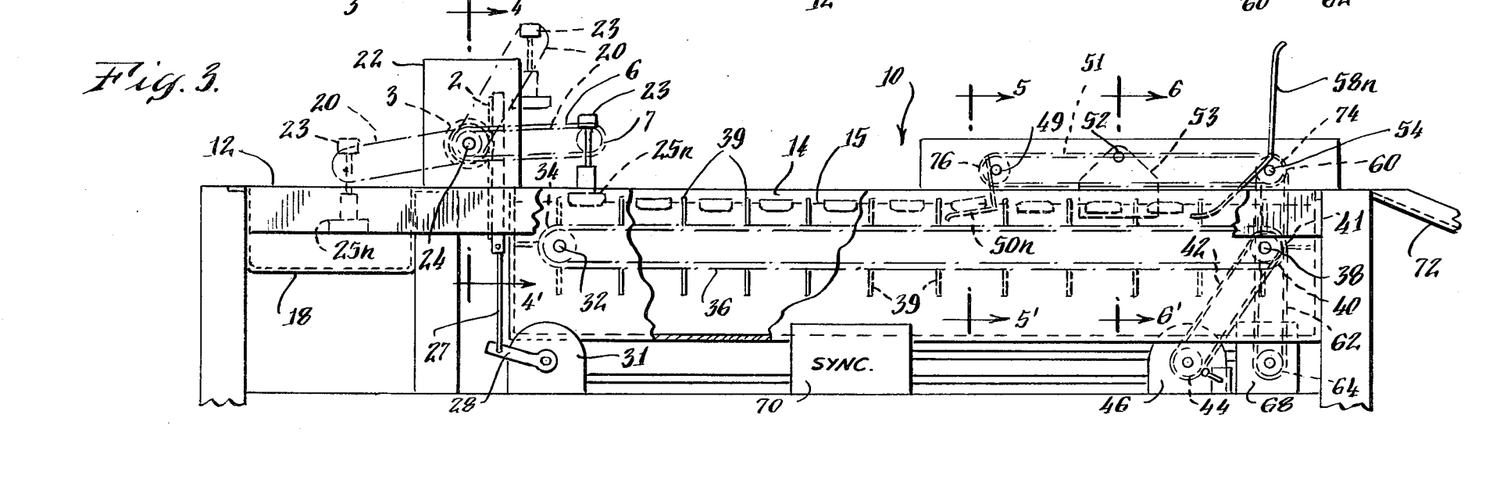
FIG. 3 is a side elevation view of the embodiment of this invention shown in FIGS. 1 and 2.

As is shown in FIGS. 2 through 6, positioned within the cooking medium tank 14, with its top run just below the level of the top surface of the cooking oil 15, is a linked conveyor belt having articulated side links 36, between the pivoted ends of which extend cross bars 37 having a series of pusher plates 39 extending upward from the cross bars 37 to such an extent that they will project to or slightly above the surface of the oil 15. The conveyor is supported at one end by sprockets 34 affixed to axles 32, and at the other end by sprockets 40 affixed to axles 38. The axle 38, in turn, is driven by servo motor 46 acting via sprocket 44, chain 42, and sprocket 41. By this means the conveyor may be advanced in intermittant step motion through operation of the servo motor 46, controlled by the synchronizer 70, thereby propelling the partially cooked but still cooking pastry products that have been left floating in the cooking medium following removal therefrom of the forming irons, from the entry end toward the discharge end of the cooking tank 14 (i.e., from left to right as shown in FIGS. 1, 2 and 3) between spacer baffles 80.

Figure 5:
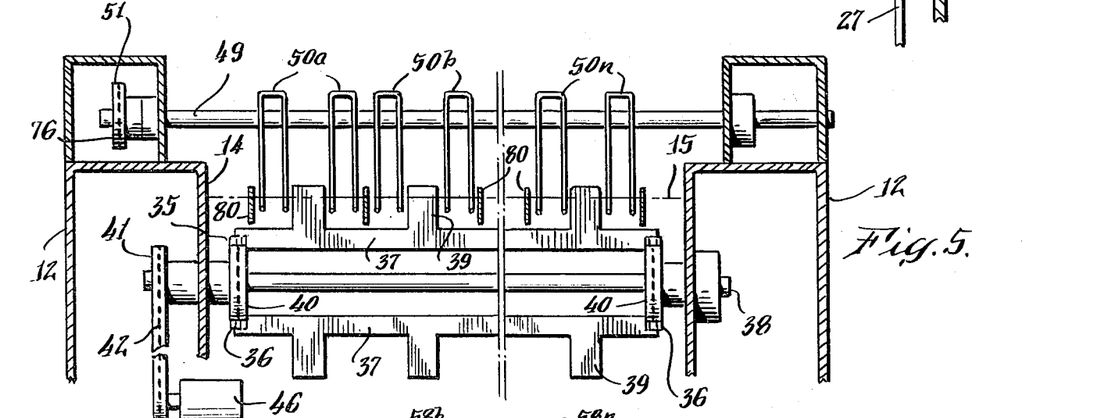
FIG. 5 is a cross-section through lines 5—$5^1$ as shown in FIG. 3.
Figure 6:
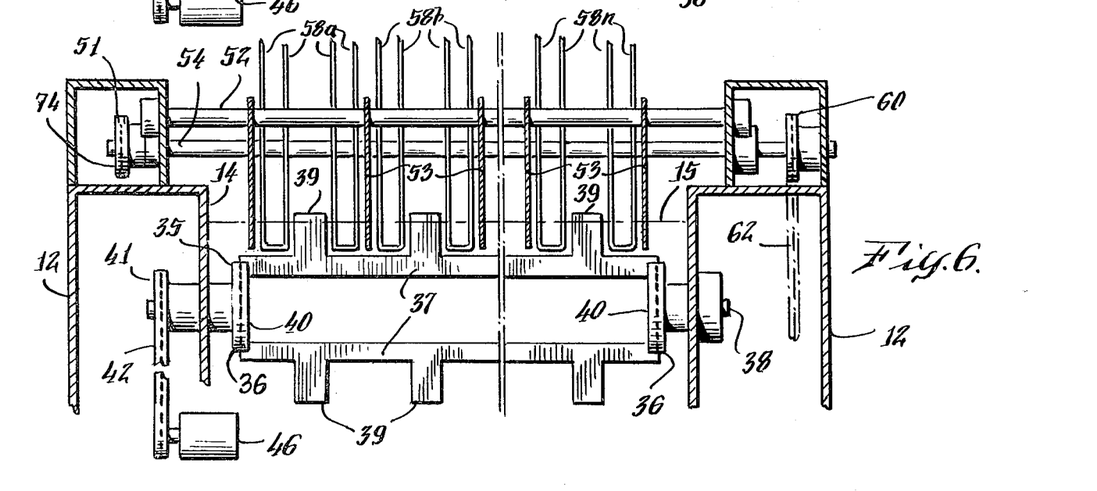
FIG. 6 is a cross-section through lines 6—$6^1$ as shown in FIG. 3.

As shown in FIGS. 1, 2 and 3, and in cross-sectional detail in FIG. 5, about two thirds of the way along the vat 14, a flipper is positioned at the top of the frame 12. It comprises an axle 49, axially arrayed along one side of which are pairs of parallel tines 50a, 50b, ... 50n, each of which preferably is slightly concave. Each tine in each such pair of tines is in the configuration of a closed, "U"-shaped tongue of round metal stock, positioned one on each side of the track followed by conveyor pusher plates 39, so that, in effect, the plates may travel between them without being obstructed by them, while moving cooking products along the surface of the cooking oil. At the same time, the tines in each pair will be so positioned that floating cooked products may be lifted up by them from the surface of the cooking oil. Through operation of sprocket 76 by chain 51 as hereinafter described, the tines 50a, 50b, . . . 50n may be caused to swing simultaneously in an arcuate path about the axis of the axle 49. Through proper synchronization of such tine motion, the partially cooked pastries may be flipped over and re-deposited upside down onto the surface of the cooking oil at the other side of the flipper.

Figure 10:
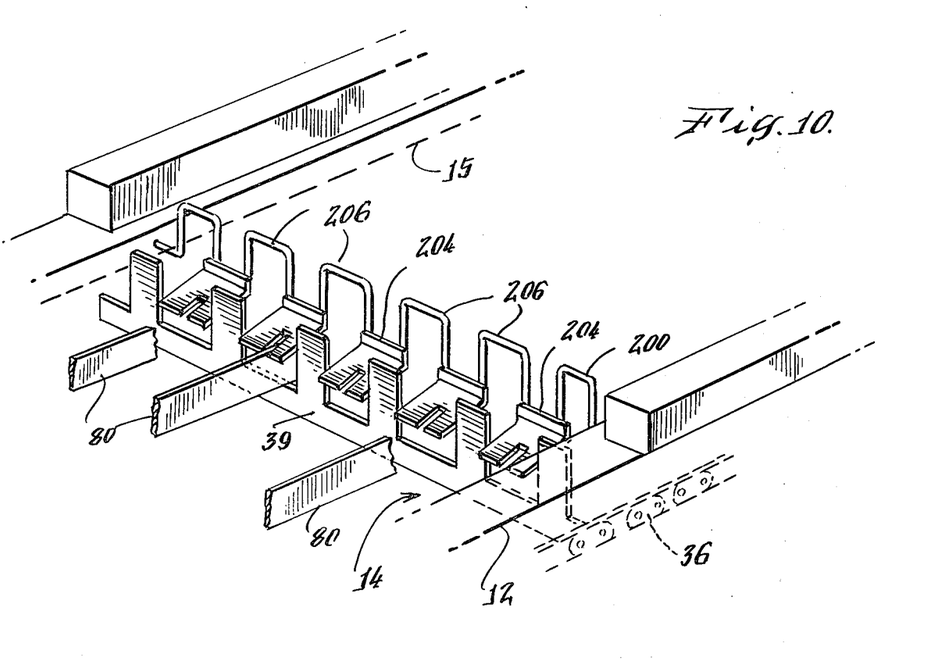
FIG. 10 illustrates another embodiment of this invention in the form of an alternative inverting means structure.

It is within the contemplation of this invention that alternatively, the partially cooked pastries may be inverted without being physically removed from the cooking liquid. For example, as shown in FIG. 10, this might be done by a "square-wave" shaped rod 200 extending across the tank with an array of sheet-metal pans 202 positioned one each on the bottommost segments of the rod and just below the surface of the cooking oil. The pans may have turned up "down stream" edges 204 by which the pastries may be stopped, followed by rotating of the rod with resulting inverting of the pastries as the pans flip over, while the pusher panels 39 can pass beneath the upper-most segments 206 of the rod.

In this portion of the cooking tank, the cooking of the pastry products is completed as they are pushed along by coveyor belt pusher plates 39 passing between the alignment baffles 53, which are flat metal plates suspended from a support rod 52 with their lower ends at or just below the top surface of the cooking oil.

At the egress end of the cooking tank 14 at its top, there is positioned an extractor 55 comprising an axle 54 having axially arrayed parallel pairs of tines 58a, 58b . . . 58n along one edge thereof. In a manner similar to that of the flipper previously described, the tines 58a, 58b . . . 58n may be swung in an arcuate path about the axis of the axle 54 through operation of servo motor 68 on sprocket 64, chain 62, and sprocket 60. Another sprocket 74 on the same axle 54 connects with the other end of chain 51, providing a means whereby the tines 50a, 50b . . . 50n and the tines 58a, 58b, . . . 58n may be simultaneously moved in concert with each other according to desired process sequences as hereinafter described, all as shown in FIGS. 1–3, 6 and 7.

The effect of so rotating the tines 58a, 58b . . . 58n is to lift totally cooked pastry products out of the cooking tank 14 and to deposit them, without inverting them, onto the rack 72 down which the pastries will slide through the action of gravity and the sloped positioning of the rack 72. The lower end of the rack 72 may be curved upward to retain cooked products on the rack, to prevent them from falling and breaking if the end of the rack is significantly above any other receiving surface. Optionally, such products may be delivered to a moving conveyor or other removing means.

Thereafter, the completed products may be gathered up, dusted with powdered sugar or otherwise treated, and packed for shipping. In process, fumes may be removed by an exhaust hood 110.

Figure 9:
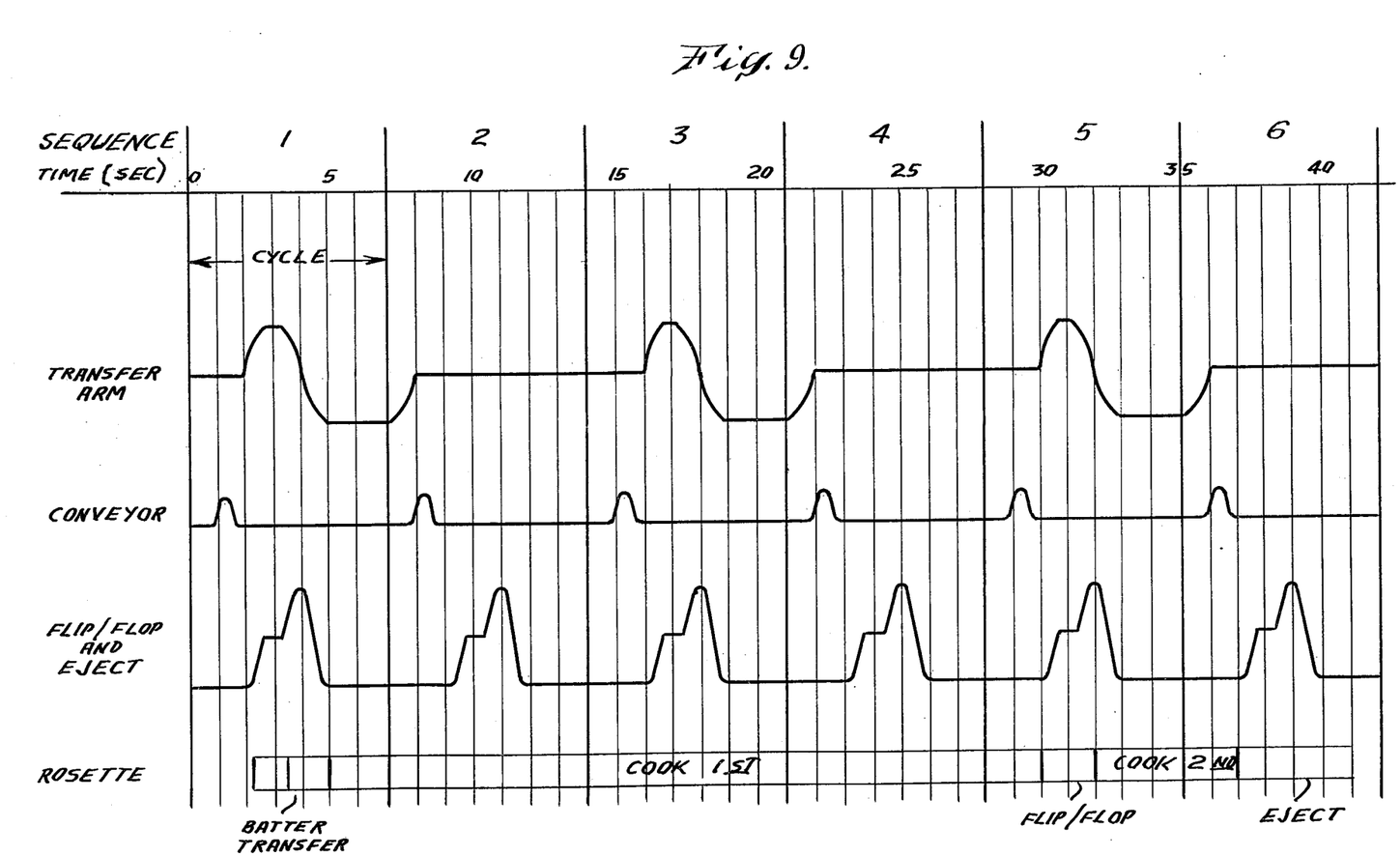
FIG. 9 is a flow chart illustrating the sequences of various of the elements of embodiments of this invention.

FIG. 9 is a time-sequence chart, illustrating the operational phases of the apparatus hereinbefore described as a function of time. This time sequence is a typical and effectual one, although it is to be recognized that it is not the only one which may be utilized in the practice of the present invention. As illustrated in FIG. 9, each sequence takes 7 seconds, and a total of 6 sequences are utilized in processing a single pastry product from beginning to end in the apparatus. The position of the principal apparatus components at successive time intervals in each of the 6 sequences comprising the entire process as to a given pastry product may be understood by comparing the following table with FIG. #9:

| @ Time (sec.) | Position of Irons (operates every other sequence only) | Motion of Conveyor | Position of flipper and extractor |
|---|---|---|---|
| 0 | stationary-dripping | stopped | stationary - in oil |
| 1 | stationary-dripping | starting motion | stationary - in oil |
| 2 | starting batter dip | motion completed | moving to pick-up level |
| 3 | dipped in batter | stopped | stationary - in pick-up level |
| 4 | moving out of batter | stopped | in motion-up and over |
| 5 | moving into oil | stopped | motion completed - returned to oil - stationary |
| 6 | in oil | stopped | stationary in oil |
| 7 | in oil | stopped | stationary in oil |
| 8 | stationary-dripping | start in motion | stationary in oil |

From the bottom-most line in FIG. 7, the progress of the pastry product through the apparatus may be followed as follows:

| Time and Sequence # | Status |
|---|---|
| Seq. 1, 2½ –3½ sec. | Irons dip in batter |
| Seq. 1, 3½ sec.,–5 sec. | Transfer irons from batter to cooking oil |
| Seq. 1, @ 5 sec. to seq. 2 @ 1½ sec. | Batter cooks while on irons |
| Seq. 2, @ 1½ sec. to Seq. 5 @ 2 sec. | Batter forms float and cook in oil as they are moved intermittantly toward flipper |
| Seq. 5, 2–4 sec. | Pastries flipped over |
| Seq. 5, 4 sec. to Seq. 6 @ 4 sec. | Second cooking of pastries |
| Seq. 6, 4 sec. | removal of pastries from cooking oil |

In the foregoing sequence, the total cumulative cooking time of each pastry is 30 seconds (i.e., 25 seconds for the first cooking cycle, plus 5 seconds for the second cycle), and the total time to process each pastry out of the total lapsed time of 42 seconds if 34⅔ seconds.

It has been found that the above-described apparatus operates to greater efficiency, productivity and effectiveness, if care is exercised to de-grease the irons after they are disassociated from the formed bakery products and before they are re-dipped in the batter. Apparently, the batter thereby tends not to become contaminated and forms an acceptable uniform and consistent coating on the irons, so that consistency and commercial acceptability of the goods so produced is enhanced. In the above-described apparatus and method of operation, this is achieved by holding the irons in a "dripping" mode (e.g., from Second 6 through Second 16) to allow ample time for such drip-removal to occur. In effect, in this particular apparatus this result is achieved merely by having the irons move once during every other operating sequence of the other moving elements, i.e., the conveyor, flipper, and removal apparatus. The driptime thereby provided for the irons is some 10 ± seconds, which is more than adequate. It has been found that as little as 4 seconds may suffice under certain circumstances, and, of course, this time may be further controlled or varied by the use of augmenting drying means, such as an airblower. In this connection, care should be used to keep the temperature of the irons as nearly constant as possible, as this appears possibly to have some effect on the formation process. This may be achieved, if desired, by such supplementary heating means as the electrical resistance wires 95 shown in FIG. 8, or as previously noted, by other apparatus adaptations.

Figure 11:
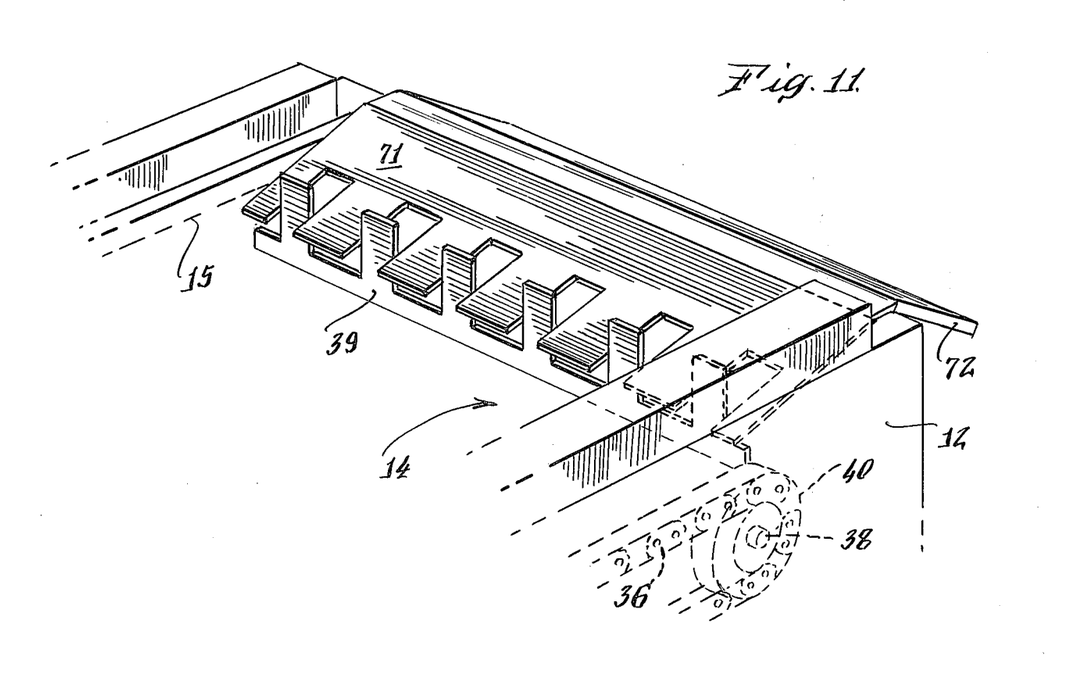
FIG. 11 illustrates another embodiment of this invention in the form of an alternative extractor means structure.

It should also be noted that it is within the contemplation of this invention that the extractor means, instead of an activetype mechanism such as the extractor 55 hereinbefore described, may instead be in the form of a passive-type structure. For example, as is shown in FIG. 11 the entire rod 52, tine 58a–58n mechanism may be deleted and replaced by a ramp 71 extending from just below the surface of the cooking oil 15 at the egress end of the conveyor to the top of the tank 14 adjacent the ramp 72. By such means, the conveyor pusher panels 39 may be caused to push cooked pastry products up the replacement ramp 71 and out of the cooking liquid and over the top edge of the tank 14, where they will then slide down the ramp 72. Such action may be facilitated by making the lower edge of the replacement ramp 71 which extends into the cooking liquid, with spaced-apart "tongues" up which the cooked pastry products may be pushed while the pusher panels 39 pass therebetween.

As noted above, virtually any number of sequences may be run parallel to each other in the same apparatus, but there are practical limits to how large any given apparatus should be made.

Alternatively, it is possible to operate several apparati in parallel or in tandem to each other. Additionally, and in any case, process times may be varied upward or downward, consistent with heat changes, batter composition, desired finished characteristics of the pastry products, and other parameters.

Accordingly, it is to be understood that the embodiments herein disclosed and discussed are by way of illustration and not of limitation, and that other embodiments may be made without departing from the spirit or scope of this invention.

I claim:

1. In apparatus for making pastry products comprising
   batter holding means,
   tank means for holding heated cooking liquid,
   forming means including at least one forming iron for forming pastry products by dipping in batter contained in said batter holding means and in heated cooking liquid in said tank means, and dipping means for so dipping said iron sequentially according to an established time sequence,
   conveyor means for conveying pastry products after removal from said iron, from the region in said tank means where said forming means dips into such cooking liquid to the region thereof where pastry are removed from such liquid,
   extractor means for causing such pastry products to be removed from such liquid, and
   inverter means for inverting such products after they have been conveyed part way toward, but before they have reached, said extractor means,
   said iron being adapted for maintaining its temperature within prescribed limits, and said apparatus including means for causing said iron to be substantially entirely free from such cooking liquid upon being dipped in such batter after having been removed from such cooking liquid.

2. The apparatus described in claim 1 wherein the forming iron in said forming means is made from material having high heat retention characteristics.

3. The apparatus described in claim 1 wherein said forming iron in said forming means includes supplementary heating means therefor.

4. The apparatus described in claim 2 wherein forming iron in said forming means includes supplementary heating means therefor.

5. The apparatus described in any of claims 1, 2, or 4 wherein said forming iron in said forming means is made from cast iron.

6. The apparatus described in any of claims 1 through 4 wherein the established time sequence for dipping said iron includes a period before dipping said iron in said batter and after removing said forming iron from said cooking liquid during which substantially entirely all of any cooking liquid carried by said iron will drip from said iron.

7. The apparatus described in any of claims 1, 2, or 4 wherein the established time sequence for dipping said iron includes a period before dipping said iron in said batter and after removing said forming iron from said cooking liquid during which substantially entirely all of any cooking liquid carried by said iron will drip from said iron, and wherein said forming iron is made from cast iron.

8. The apparatus described in any of claims 1 through 4 wherein said extractor means comprises moveable means for lifting cooked pastry products from the surface of such cooking liquid and delivering them to removal means for causing said products to be removed from the region of said extractor means for subsequent processing.

9. The apparatus described in any of claims 1, 2, or 4 wherein said extractor means comprises moveable means for lifting cooked pastry products from the surface of such cooking liquid and delivering them to removal means for causing said products to be removed from the region of said extractor means for subsequent processing, and wherein said forming iron is made from cast iron.

10. The apparatus described in any of claims 1 through 4 wherein said extractor means comprises moveable means for lifting cooked pastry products from the surface of such cooking liquid and delivering them to removal means for causing said products to be removed from the region of said extractor means for subsequent processing, and wherein the established time sequence for dipping said iron includes a period before dipping said irons in said batter and after removing said forming iron from said cooking liquid during which substantially entirely all of any cooking liquid carried by said iron will drip from said iron.

11. The apparatus described in any of claims 1, 2, or 4 wherein said extractor means comprises moveable means for lifting cooked pastry products from the surface of such cooking liquid and delivering them to removal means for causing said products to be removed from the region of said extractor means for subsequent processing, and wherein said forming iron is made from cast iron, and wherein the established time sequence for dipping said iron includes a period before dipping said irons in said batter and after removing said forming iron from said cooking liquid during which substantially entirely all of any cooking liquid carried by said iron will drip from said iron.

12. Apparatus for making pastry products comprising a main tank for holding heated cooking liquid, a batter container adjacent said main tank, forming means, located at one end of said tank comprising a multiplicity of irons, the temperature of which are regulated so as to be maintained within desired limits and which are moveably affixed by gimble to dipping means for alternately dipping said irons into such batter container so as to coat said irons with batter and then into said cooking liquid to initiate cooking of said batter, said dipping means including means for regulating the time sequences through which said irons are so moved as to permit substantially all of any cooking liquid remaining on said irons after they have been dipped into said tank to drip therefrom and as to keep said irons while batter coated in said cooking liquid for a sufficient amount of time to permit said batter to become cooked sufficiently to have sufficient structural integrity not to break apart, to separate readily from said irons, and to float on the surface of said liquid, conveyor means for causing products to be pushed, while floating in the surface of said cooking liquid, along a travel path from the forming means end of said tank to the opposite end of said tank, inverter means for causing pastry products to be removed from the surface of said cooking liquid part way along said travel path, inverting them, and returning them to said cooking liquid to be pushed further along said travel path by said conveyor means, extractor means at said opposite end of said tank for causing products to be removed from said cooking liquid and delivered to removal means for further processing, motor means for causing motion of the moveable elements of said apparatus to move, and synchronizer means for regulating the motion of said forming means, said conveyor means, and said inverter means according to established time sequences which are co-operative mutually and with said extractor means to cause pastry products to be formed from batter and cooked according to established positional and time sequences.

* * * * *